United States Patent
Pernias et al.

(10) Patent No.: US 12,461,967 B2
(45) Date of Patent: Nov. 4, 2025

(54) MULTI-MODAL CONTENT BASED AUTOMATED FEATURE RECOGNITION

(71) Applicant: Disney Enterprises, Inc., Burbank, CA (US)

(72) Inventors: Pablo Pernias, Sant Joan d'Alacant (ES); Monica Alfaro Vendrell, Barcelona (ES); Francesc Josep Guitart Bravo, Lleida (ES); Marc Junyent Martin, Barcelona (ES); Miquel Angel Farre Guiu, Bern (CH)

(73) Assignee: Disney Enterprises Inc., Burbank, CA (US)

( * ) Notice: Subject to any disclaimer, the term of this patent is extended or adjusted under 35 U.S.C. 154(b) by 292 days.

(21) Appl. No.: 17/460,910

(22) Filed: Aug. 30, 2021

(65) Prior Publication Data
US 2023/0068502 A1    Mar. 2, 2023

(51) Int. Cl.
*G06F 16/75*    (2019.01)
*G06F 16/68*    (2019.01)
(Continued)

(52) U.S. Cl.
CPC ............ *G06F 16/75* (2019.01); *G06F 16/686* (2019.01); *G06F 16/735* (2019.01);
(Continued)

(58) Field of Classification Search
None
See application file for complete search history.

(56) References Cited

U.S. PATENT DOCUMENTS 7,738,778 B2 *  6/2010  Agnihotri .......... H04N 7/17318
                                                  348/700
9,870,798 B2 *  1/2018  Pribula .................... H04L 51/10
(Continued)

FOREIGN PATENT DOCUMENTS

CN         112818906 A       5/2021

OTHER PUBLICATIONS

Ilya Tolstikhin, Neil Houlsby, Alexander Kolesnikov, Lucas Beyer, Xiaohua Zhai, Thomas Unterthiner, Jessica Yung, Andreas Steiner, Daniel Keysers, Jakob Uszkoreit, Mario Lucic, Alexey Dosovitskiy. MLP-Mixer: An all-MLP Architecture for Vision. Work done during Google AI Residency. Jun. 11, 2021. pp. 1-16.
(Continued)

*Primary Examiner* — Daniel T Tekle
(74) *Attorney, Agent, or Firm* — Farjami & Farjami LLP

(57) ABSTRACT

A system includes a computing platform having processing hardware, and a memory storing software code and a machine learning (ML) model-based feature classifier. When executed, the software code receives media content including a first media component corresponding to a first media mode and a second media component corresponding to a second media mode, encodes the first media component using a first encoder to generate multiple first embedding vectors, and encodes the second media component using a second encoder to generate multiple second embedding vectors. The software code further combines the first embedding vectors and the second embedding vectors to provide an input data structure for a neural network mixer, process, using the neural network mixer, the input data structure to provide feature data corresponding to a feature of the media content, and predict, using the ML model-based feature classifier and the feature data, a classification of the feature.

20 Claims, 6 Drawing Sheets

(51) Int. Cl.
*G06F 16/735* (2019.01)
*G06F 16/78* (2019.01)
*G06N 3/045* (2023.01)
*G06N 20/00* (2019.01)

(52) U.S. Cl.
CPC ......... *G06F 16/7867* (2019.01); *G06N 3/045* (2023.01); *G06N 20/00* (2019.01)

(56) References Cited

U.S. PATENT DOCUMENTS

| | | | |
|---|---|---|---|
| 11,398,099 B1* | 7/2022 | Balakrishnan | G06F 16/332 |
| 11,503,383 B1* | 11/2022 | Asarikuniyil | G06F 18/24 |
| 11,621,792 B2* | 4/2023 | Beckett, III | H04H 60/48 382/159 |
| 2020/0042636 A1* | 2/2020 | Routray | H04L 63/1425 |
| 2020/0083973 A1* | 3/2020 | Beckett, III | G06N 20/00 |
| 2020/0145692 A1* | 5/2020 | Xu | G06N 20/00 |
| 2020/0184044 A1* | 6/2020 | Zatloukal | G06N 20/00 |
| 2021/0232907 A1* | 7/2021 | Pardeshi | G06N 3/08 |
| 2021/0264203 A1* | 8/2021 | Fuxman | G06F 18/24 |
| 2021/0334459 A1* | 10/2021 | Dvijotham | G06F 40/247 |
| 2022/0036083 A1* | 2/2022 | Chandrasekaran | G06F 40/30 |
| 2022/0245424 A1* | 8/2022 | Goyal | G06V 10/82 |
| 2022/0309335 A1* | 9/2022 | Varghese | G06F 8/427 |
| 2023/0049550 A1* | 2/2023 | Roy | G06F 18/214 |
| 2023/0092969 A1* | 3/2023 | Chang | G06F 18/2137 706/15 |
| 2024/0037948 A1* | 2/2024 | Chen | G06F 16/732 |

OTHER PUBLICATIONS

Luke Melas-Kyriazi. Do You Even Need Attention? A Stack of Feed-Forward Layers Does Surprisingly Well on ImageNet. Oxford University. May 6, 2021. pp. 1-4.

Hugo Touvron, Piotr Bojanowski, Mathilde Caron, Matthieu Cord, Alaaeldin El-Nouby, Edouard Grave, Gautier Izacard, Armand Joulin, Gabriel Synnaeve, Jakob Verbeek, Hervé Jégou. ResMLP: Feedforward networks for image classification with data-efficient training. Jun. 10, 2021. pp. 1-18.

Qibin Hou, Zihang Jiang, Li Yuan, Ming-Ming Cheng, Shuicheng Yan, Jiashi Feng. Vision Permutator: A Permutable MLP-Like Architecture for Visual Recognition. Jun. 23, 2021. pp. 1-12.

Extended European Search Report dated Jan. 19, 2023 for EP Application 22191381.7.

Bin Duan, Hao Tang, Wei Wang, Ziliang Zong, Guowei Yang, Yan Yan "Audio-Visual Event Localization via Recursive Fusion by Joint Co-Attention" Aug. 14, 2020 10 Pgs.

Office Action dated Dec. 18, 2024 in European Application 22191381.7.

* cited by examiner

MULTI-MODAL CONTENT BASED AUTOMATED FEATURE RECOGNITION

BACKGROUND

Due to its popularity as a content medium, ever more audio-video (AV) content is being produced and made available to users. As a result, the efficiency with which such AV content can be annotated. i.e., "tagged," and managed has become increasingly important to the producers, owners, and distributors of that content. For example, annotation of AV content is an important part of the production process for television (TV) programming content and movies.

Tagging of AV content has traditionally been performed manually by human taggers. However, in a typical AV content production environment, there may be so much content to be annotated that manual tagging becomes impracticable. In response, various automated systems for performing content tagging have been developed or are in development. While offering efficiency advantages over traditional manual techniques for the identification of features that can be recognized based on a single content mode, such as video alone, audio alone, or text alone, conventional automated tagging solutions can be unreliable when used to classify features requiring more than one content mode for their identification. Consequently, there is a need in the art for systems and methods enabling reliable multi-modal content based automated feature recognition.

DETAILED DESCRIPTION

Figure 1:
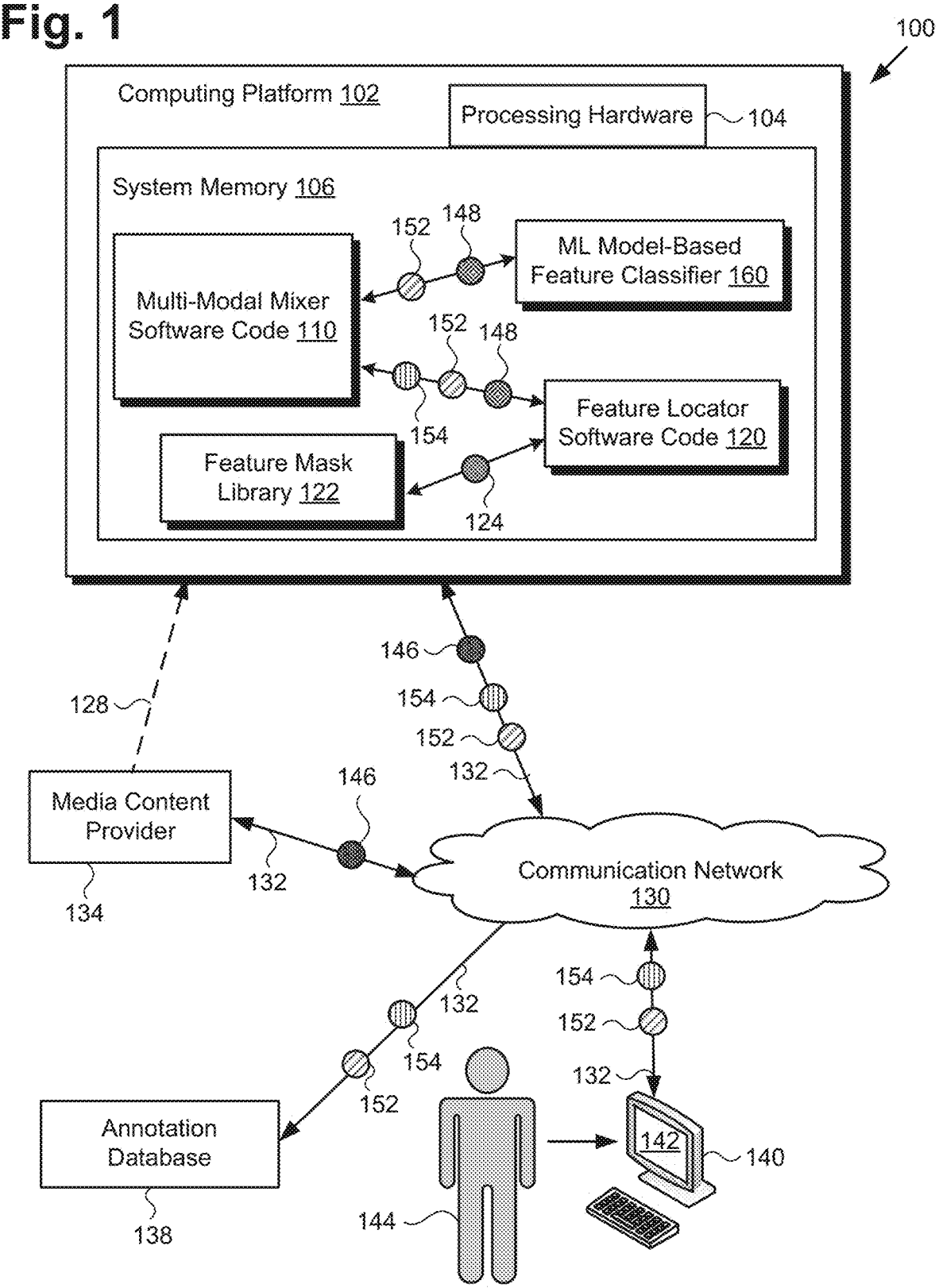
FIG. 1 shows a diagram of an exemplary system for performing multi-modal content based automated feature recognition, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing multi-modal content based automated feature recognition that overcome the drawbacks and deficiencies in the conventional art. In various implementations, the media content processed using the systems and methods disclosed in the present application may include audio-video (AV) content in the form of video games, movies, or episodic television (TV) content that includes episodes of TV shows that are broadcast, streamed, or otherwise available for download or purchase on the Internet or via a user application. Moreover, the multi-modal content based feature recognition solution disclosed herein may advantageously be performed as an automated process.

It is noted that, as defined in the present application, the terms "automation," "automated," and "automating" refer to systems and processes that do not require the participation of a human user, such as a human editor or system administrator. For example, although in some implementations a human editor or system administrator may review the performance of the systems and methods disclosed herein, that human involvement is optional. Thus, the processes described in the present application may be performed under the control of hardware processing components of the disclosed systems.

It is further noted that, as defined in the present application, the expression "media mode" refers to one of: a) images, including video without audio, b) audio, including speech and non-verbal sounds, and c) text, including a script, subtitles, other captions, a synopsis, and metadata formatted as text describing one or more images or audio included in media content, such as production comments for example. Moreover, although the term "video" is elsewhere sometimes used synonymously with AV content, as used in the present application, the term video refers exclusively to video images without audio.

It is also noted that the term media content "feature" may refer to any object, location, performer, character, or activity depicted or represented in one or more media modes of media content. That is to say, a feature may be any object, location, performer, character, or activity depicted in an image or images included in media content, such as one or more video frames, for example. In addition, or alternatively, a feature may be any object, location, performer, character, or activity described by or producing audio or described by text included in media content. Accordingly, multi-modal content is defined to be media content including two or more media modes, such as video and audio, video and text, audio and text, or video, audio, and text, for example.

FIG. 1 shows exemplary system 100 for performing multi-modal content based automated feature recognition, according to one implementation. As shown in FIG. 1, system 100 includes computing platform 102 having processing hardware 104 and system memory 106 implemented as a computer-readable non-transitory storage medium. According to the present exemplary implementation, system memory 106 stores multi-modal mixer software code 110, feature locator software code 120, machine learning (ML) model-based feature classifier 160, which may be a trained ML model based classifier, and feature mask library 122.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models. Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

As further shown in FIG. 1, system 100 is implemented within a use environment including media content provider 134 providing media content 146, annotation database 138, communication network 130 and system user 144 utilizing user system 140 including display 142. In addition, FIG. 1 shows network communication links 132 communicatively coupling media content provider 134, annotation database 138, and user system 140 with system 100 via communication network 130. Also shown in FIG. 1 are multi-modal feature data 148, feature mask 124, feature classification 152, and feature timestamp 154. It is noted that although system 100 may receive media content 146 from media content provider 134 via communication network 130 and network communication links 132, in some implementations, media content provider 134 may take the form of a content source integrated with computing platform 102, or may be in direct communication with system 100 as shown by dashed communication link 128.

As noted above, media content 146 may include AV content in the form of a video game, a movie, or episodic programming content including streamed episodic content or broadcasted episodic content, for example. Media content 146 may include a high-definition (HD) or ultra-HD (UHD) baseband video signal with embedded audio, captions, timecode, and other ancillary metadata, such as ratings and parental guidelines. In some implementations, media content 146 may be provided by media content provider 134, such as a TV broadcast network or other media distribution entity (e.g., a movie studio, a streaming platform, etc.), utilizing secondary audio programming (SAP) or Descriptive Video Service (DVS), for example.

With respect to the representation of system 100 shown in FIG. 1, it is noted that although multi-modal mixer software code 110, feature locator software code 120. ML model-based feature classifier 160, and feature mask library 122 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts multi-modal mixer software code 110, feature locator software code 120. ML model-based feature classifier 160, and feature mask library 122 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that multi-modal mixer software code 110, feature locator software code 120, ML model-based feature classifier 160, and feature mask library 122 may be stored remotely from one another within the distributed memory resources of system 100.

It is also noted that, in some implementations. ML model-based feature classifier 160 may take the form of a software module included in multi-modal mixer software code 110. However, in other implementations, ML model-based feature classifier 160 may be omitted from system 100 and the functionality attributed to that feature may be performed by multi-modal mixer software code 110.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as multi-modal mixer software code 110 and feature locator software code 120, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 140 is shown as a desktop computer in FIG. 1, that representation is provided merely as an example. More generally, user system 140 may be any suitable mobile or stationary computing device or system that implements data processing capabilities sufficient to provide a user interface, support connections to communication network 130, and implement the functionality ascribed to user system 140 herein. For example, in some implementations, user system 140 may take the form of a laptop computer, tablet computer, or smartphone, for example. However, in other implementations user system 140 may be a "dumb terminal" peripheral component of system 100 that enables system user 144 to provide inputs via a keyboard or other input device, as well as to view feature classification 152 and feature timestamp 154 on display 142. In those implementations, user system 140 and display 142 may be controlled by processing hardware 104 of system 100.

With respect to display 142 of user system 140, display 142 may be physically integrated with user system 140 or may be communicatively coupled to but physically separate from user system 140. For example, where user system 140 is implemented as a smartphone, laptop computer, or tablet computer, display 142 will typically be integrated with user system 140. By contrast, where user system 140 is implemented as a desktop computer, display 142 may take the form of a monitor separate from user system 140 in the form of a computer tower. Moreover, display 142 may be implemented as a liquid crystal display (LCD), light-emitting diode (LED) display, organic light-emitting diode (OLED) display, quantum dot (QD) display, or any other suitable display screen that performs a physical transformation of signals to light.

Figure 2:
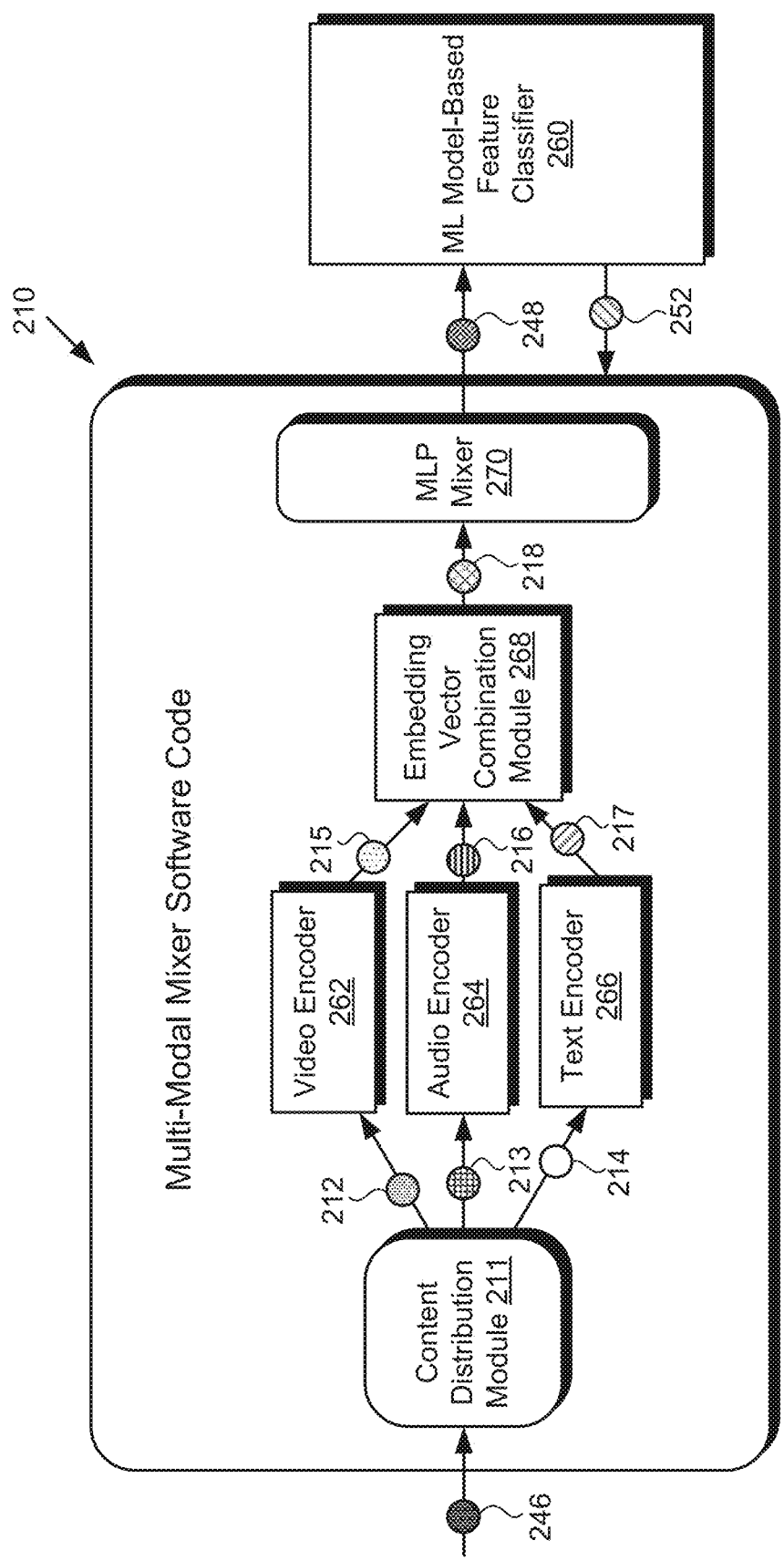
FIG. 2 shows a diagram of an exemplary multi-modal mixer software code suitable for use by the system shown in FIG. 1, according to one implementation.

FIG. 2 shows a diagram of exemplary multi-modal mixer software code 210 suitable for use by system 100, in FIG. 1, according to one implementation, together with ML model-based feature classifier 260. According to the exemplary implementation shown in FIG. 2, multi-modal mixer software code 210 may include content distribution module 211, video encoder 262, audio encoder 264, text encoder 266, embedding vector combination module 268 and neural network mixer 270, which, in some implementations may take the form of a Multi-Layer Perceptron (MLP) mixer (hereinafter "MLP mixer 270"). Also shown in FIG. 2 are media content 246, video component 212 of media content 246, audio component 213 of media content 246, text component 214 of media content 246, video embedding vectors 215, audio embedding vectors 216, text embedding vectors 217, input data structure 218 to MLP mixer 270, feature data 248 and feature classification 252.

It is noted that the exemplary implementation shown in FIG. 2 corresponds to use cases in which media content 246 includes content in each of first, second, and third media modes, e.g., video, audio, and text. However, the present novel and inventive concepts are equally applicable to media content that includes content in only two media modes. e.g., video and audio but not text, video and text but not audio, or audio and text but not video.

It is further noted that although FIG. 1 depicts a single encoder for each media mode included in media content 246, that representation is also merely by way of example. More generally, each of video encoder 262, audio encoder 264, and text encoder 266 may correspond to more than one encoder for that particular media mode. For instance, video encoder 262 may include an encoder customized for animation or video games, and another encoder customized for video from movies or episodic TV. As another example, audio encoder 264 may include an encoder customized for extracting information from audio spectrograms, and another encoder customized for extracting information from raw audio samples. As yet another example, text encoder 266 may include an encoder customized for closed captions, and another encoder customized for synopses.

With respect to video embedding vectors 215, audio embedding vectors 216, text embedding vectors 217, those vectors are respective representations of characteristics of the video, audio, and text included in media content 246, in respective customized vector spaces. Thus, video embedding vectors 215 include vector projections of image characteristics of video component 212 onto a customized image space, while audio embedding vectors 216 include vector projections of sound characteristics of audio component 213 onto a customized audio space, and text embedding vectors 217 include vector projections of word or phrase characteristics of text component 214 onto a customized semantic space.

Media content 246, multi-modal mixer software code 210. ML model-based feature classifier 260, feature data 248, and feature classification 252 correspond respectively in general to media content 146, multi-modal mixer software code 110, ML model-based feature classifier 160, multi-modal feature data 148, and feature classification 152, in FIG. 1. Thus, media content 146, multi-modal mixer software code 110, ML model-based feature classifier 160, multi-modal feature data 148, and feature classification 152 may share any of the characteristics attributed to respective media content 246, multi-modal mixer software code 210. ML model-based feature classifier 260, feature data 248, and feature classification 252 by the present disclosure, and vice versa. That is to say, although not shown in FIG. 1, like multi-modal mixer software code 210, multi-modal mixer software code 110 may include content distribution module 211, video encoder 262, audio encoder 264, text encoder 266, embedding vector combination module 268, and MLP mixer 270.

Figure 3:
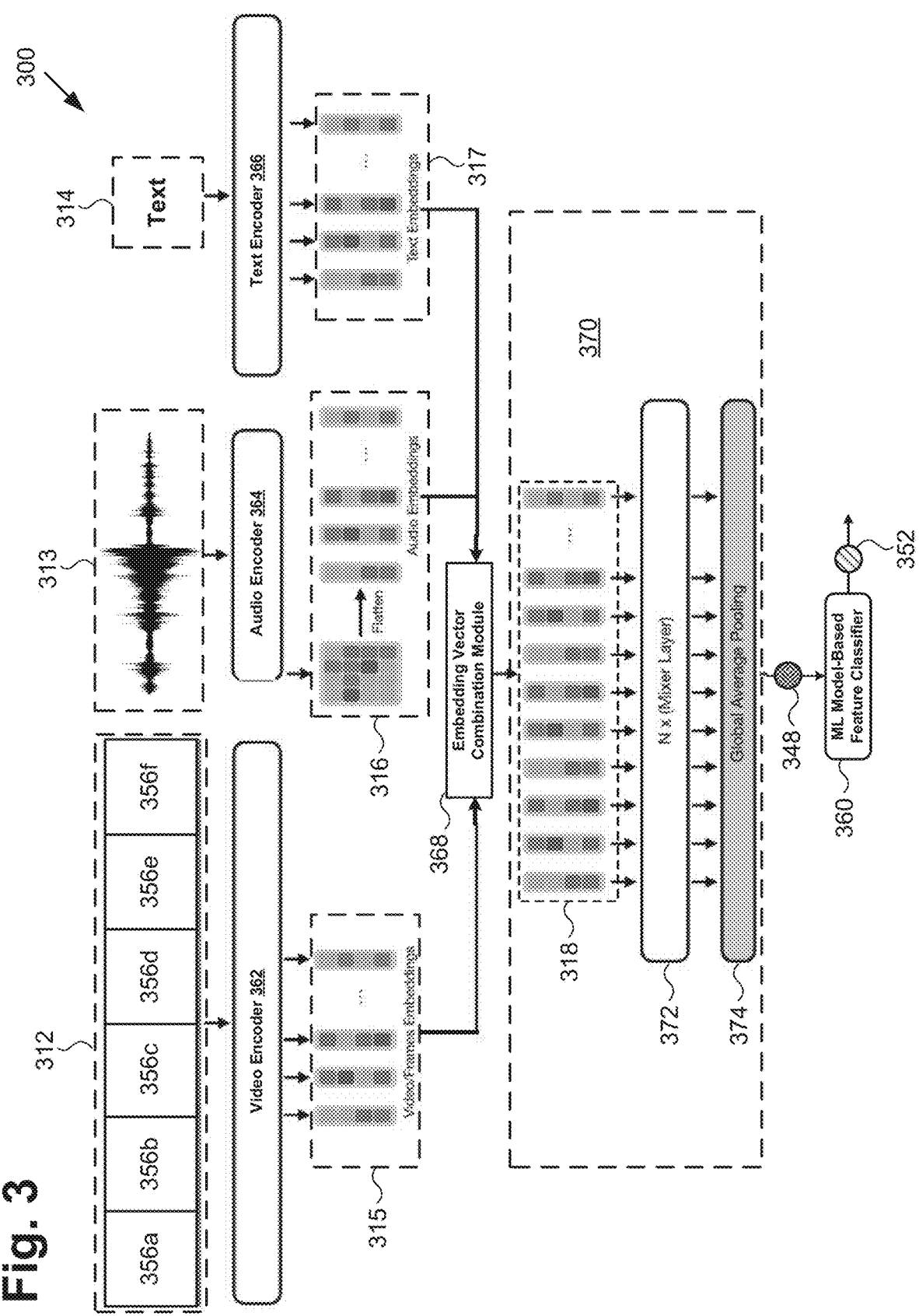
FIG. 3 depicts an exemplary processing pipeline for performing multi-modal content based automated feature recognition, according to one implementation.

FIG. 3 depicts exemplary processing pipeline 300 for performing multi-modal content based automated feature recognition, according to one implementation, that corresponds to some of the operations performed by multi-modal mixer software code 110/210, as well as that performed by ML model-based feature classifier 160/260, in FIGS. 1 and 2. According to the exemplary implementation shown in FIG. 3, processing pipeline 300 may receive video component 312 including video frames 356*a*. 356*b*, 356*c*. 356*d*, 356*e*, and 356*f* (hereinafter "video frames 356*a*-356*f*"). In addition and as further shown in FIG. 3, processing pipeline 300 may receive both of audio component 313 in the form of an audio spectrogram, and text component 314. Alternatively, processing pipeline 300 may receive video component 312 and one of audio component 313 or text component 314, or may receive only audio component 313 and text component 314 but not video component 312. It is noted that, in some implementations, audio component 313 in the form of an audio spectrogram may be generated upstream of processing pipeline 300. Referring to FIG. 2, for example, in some implementations, audio component 213 in the form of audio spectrogram 313 may be generated by content distribution module 211 of multi-modal mixer software code 210, based on raw audio samples included in media content 246.

Processing pipeline 300 may further include video encoder 362, audio encoder 364, text encoder 366, embedding vector combination module 368, neural network mixer 370, and ML model-based feature classifier 360. In some implementations, neural network mixer 370 may take the form of an MLP mixer (hereinafter "MLP mixer 370") including multiple "N" mixing layers 372, where N corresponds to an integer value, as well as global average pooling layer 374. Also shown in FIG. 3 are video embedding vectors 315, audio embedding vectors 316, text embedding vectors 317, input data structure 318 to MLP mixer 370, feature data 348 and feature classification 352.

Video encoder 362, audio encoder 364, text encoder 366, embedding vector combination module 368, and MLP mixer 370 correspond respectively in general to video encoder 262, audio encoder 264, text encoder 266, embedding vector combination module 268, and MLP mixer 270, in FIG. 2. Thus, video encoder 362, audio encoder 364, text encoder 366, embedding vector combination module 368, and MLP mixer 370 may share any of the characteristics attributed to respective video encoder 262, audio encoder 264, text encoder 266, embedding vector combination module 268, and MLP mixer 270 by the present disclosure, and vice versa. In addition, video component 312, audio component 313, text component 314, and input data structure 318 to MLP mixer 370 correspond respectively to video component 212, audio component 213, text component 214, and input data structure 218, in FIG. 2. That is to say, video component 312, audio component 313, text component 314, and input data structure 318 may share any of the characteristics attributed to respective video component 212, audio component 213, text component 214, and input data structure 218 by the present disclosure, and vice versa.

Moreover, feature data 348, ML model-based feature classifier 360, and feature classification 352 correspond respectively in general to multi-modal feature data 148/248, ML model-based feature classifier 160/260, and feature classification 152/252 in FIGS. 1 and 2. Consequently, feature data 348, ML model-based feature classifier 360, and feature classification 352 may share any of the characteristics attributed to respective multi-modal feature data 148/248, ML model-based feature classifier 160/260, and feature classification 152/252 by the present disclosure, and vice versa.

Figure 4A:
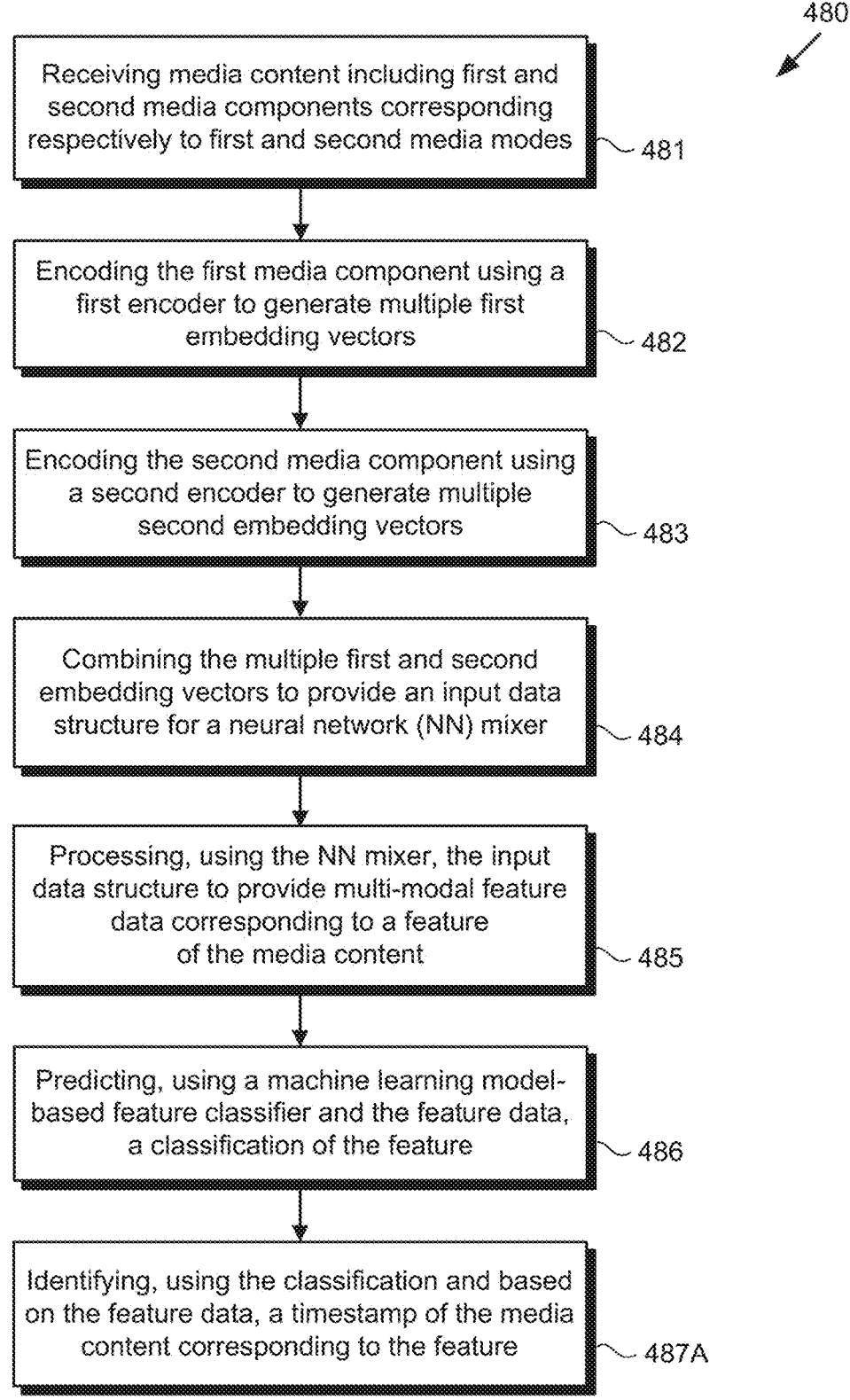
FIG. 4A shows a flowchart outlining an exemplary method for performing multi-modal content based automated feature recognition, according to one implementation.

The functionality of system 100 and processing pipeline 300 will be further described by reference to FIG. 4A. FIG. 4A shows flowchart 480 presenting an exemplary method for use by system 100 to perform multi-modal content based automated feature recognition, according to one implementation. With respect to the method outlined in FIG. 4A, it is noted that certain details and features have been left out of flowchart 480 in order not to obscure the discussion of the inventive features in the present application.

Referring now to FIG. 4A in combination with FIGS. 1, 2, and 3, flowchart 480 may begin with receiving media content 146/246 including a first media component corresponding to a first media mode and a second media component corresponding to a second media mode (action 481). In this example, the first media component is video component 212/312 and the second media component is audio component 213/313. Media content 146/246 may be received in action 481 by content distribution module 211 of multi-modal mixer software code 110/210, executed by processing hardware 104 of computing platform 102.

It is noted that although video component 212/312 is identified above as the first media component and audio component 213/313 is identified as the second media component, those characterizations are merely by way of example. More generally, any of video component 212/312, audio component 213/313, or text component 214/314 may be identified as the first media component, while any other one of video component 212/312, audio component 213/313, and text component 214/314 may be identified as the second media component. That is to say, in various use cases, the first media mode may be one of video, audio, or text, while the second media mode may be another of video, audio, or text.

As described by reference to FIG. 3, video component 212/312 may include multiple video frames 356a-356f, while audio component 213/313 may take the form of an audio spectrogram or raw audio samples. Where audio component 213/313 is an audio spectrogram or other type of acoustic fingerprint, such as a Chromaprint or Mel Spectrogram using the Mel (melody) scale for example, audio component 213/313 may be generated by content distribution module 211 of multi-modal mixer software code 110/210 using an open source acoustic fingerprint extraction resource, such as Chromaprint software, for example.

It is further noted that in some use cases, media content 146/246 may include more than two media components corresponding respectively to two media modes. For example, in some use cases media content 146/246 may include a third media component (hereinafter "text component 214/314") corresponding to a third media mode. Thus, in some implementations, content distribution module 211 of multi-modal mixer software code 110/210 may be executed by processing hardware 104 to receive media content 146/246 including video component 212/312, audio component 213/313, and text component 214/314. In other words, in some use cases the first media mode may be video, the second media mode may be audio, and the third media mode may be text.

Moreover, one or more of video component 212/312, audio component 213/313, and text component 214/314 may include respective video, audio, and text from different sources included in media content 146/246. For example, text component 214/314 may include text obtained from closed captions as well as text obtained from production notes or synopses, while audio component 213/313 may include audio captured by a first microphone capturing audio of a performance, and a second microphone capturing a live audience reaction to the performance, and so forth.

It is also noted that although text component 214/314 is identified as the third media component, that characterization is also merely by way of example. More generally, any of video component 212/312, audio component 213/313, or text component 214/314 may be identified as the first media component, while any other one of video component 212/312, audio component 213/313, and text component 214/314 may be identified as the second media component or the third media component.

Flowchart 480 further includes encoding the first media component (e.g., video component 212/312), using a first encoder of multi-modal mixer software code 110/210 (e.g., video encoder 262), to generate multiple first embedding vectors (e.g., video embedding vectors 215/315) (action 482). Video embedding vectors 215/315 may be generated in action 482 based on video component 212/312 of media content 146/246 by multi-modal mixer software code 110/210, executed by processing hardware 104, and using video encoder 262.

Video encoder 262 may be an NN based video encoder. For example, in some implementations, video encoder 262 may be a trained convolutional NN (CNN) in the form of a residual NN, such as a trained ResNet34/R3D for instance.

Flowchart 480 further includes encoding the second media component (e.g., audio component 213/313), using a second encoder of multi-modal mixer software code 110/210 (e.g., audio encoder 264), to generate multiple second embedding vectors (e.g., audio embedding vectors 216/316) (action 483). Audio embedding vectors 216/316 may be generated in action 483 based on audio component 213/313 of media content 146/246 by multi-modal mixer software code 110/210, executed by processing hardware 104, and using audio encoder 264. Audio encoder 264 may be an NN based audio encoder. For example, in some implementations, audio encoder 264 may be a trained CNN in the form of a residual NN, such as a trained ResNet34 for instance.

In use cases in which media content 146/246 includes a third media component (e.g., text component 214/314), the method outlined by flowchart 480 may further include encoding the third media component, using a third encoder of multi-modal mixer software code 110/210 (e.g., text encoder 266), to generate multiple third embedding vectors (e.g., text embedding vectors 217/317). Text embedding vectors 217/317 may be generated based on text component 214/314 of media content 146/246 by multi-modal mixer software code 110/210, executed by processing hardware 104, and using text encoder 266. Text encoder 266 may be a transformer machine learning model. For example, in some implementations, text encoder 266 may take the form of a Bidirectional Encoder Representations from Transformers (BERT) encoder, or a BERT large encoder, as known in the art. Thus, in various implementations, one or more of video encoder 262, audio encoder 264, and text encoder 266 may take the form of a residual neural network or a transformer machine learning model.

It is noted that in use cases in which video component 212/312 is omitted from media content 146/246, video encoder 262 may simply be bypassed while the encoding of audio component 213/313 and text component 214/314 by respective audio encoder 264 and text encoder 266 takes place. Analogously, in use cases in which one of audio component 213/313 of text component 214/314 is omitted from media content 146/246, its corresponding encoder may be bypassed. It is further noted that the encoding of one or more of video component 212/312, audio component 213/313, and text component 214/314 by respective video encoder 262, audio encoder 264, and text encoder 266 may be performed in parallel. i.e., substantially concurrently. Thus, although flowchart 480 shows action 483 as following action 482, in various implementations, action 483 may precede action 482, may follow action 482, or may be performed substantially concurrently with action 482.

Flowchart 480 further includes combining the first embedding vectors (e.g., video embedding vectors 215/315) and the second embedding vectors (e.g., audio embedding vectors 216/316) to provide input data structure 218/318 for MLP mixer 270/370 of multi-modal mixer software code 110/210 (action 484). In use cases in which video embedding vectors 215/315 and audio embedding vectors 216/316 are generated in actions 482 and 483, video embedding vectors 214/315 may be concatenated or otherwise combined with audio embedding vectors 216/316. Video embedding vectors 215/315 may be combined with audio embedding vectors 216/316 to provide input data structure 218/318 in action 484 by multi-modal mixer software code 110/210, executed by processing hardware 104, and using embedding vector combination module 268/368. It is noted that in use cases in which media content 146/246 includes a third media component (e.g., text component 214/314), the method outlined by flowchart 480 may combine text embedding vectors 217/317 with video embedding vectors 215/315 and audio embedding vectors 216/316 to provide input data structure 218/318 for MLP mixer 270/370.

It is noted that although in some use cases the number of embedding vectors included among video embedding vectors 214/315 may equal the number of embedding vectors included among each of one or both of audio embedding vectors 216/316 and text embedding vectors 217/317, in other use cases the number of video embedding vectors 214/315 may differ from the number of audio embedding vectors 216/316, and the different numbers of each of video embedding vectors 214/315 and audio embedding vectors 216/316 may differ from the number of text embedding vectors 217/317.

Flowchart 480 further includes processing, using MLP mixer 270/370, input data structure 218/318 to provide multi-modal feature data 148/248/348 corresponding to a feature of media content 146/246 (action 485). As noted above, a feature of media content 146/246 may be any object, location, performer, character, or activity depicted or represented in one or more media modes of media content 146/246. It is noted that MLP mixer 270/370 is typically tuned during training to provide multi-modal feature data 148/248/348 that preferentially focuses on a particular type of feature included in media content 146/246. Thus, for example, where MLP mixer 270/370 is tuned during training to focus on the specific feature "activity." other types of features included in media content 146/246, such as objects, locations, performers, or characters, may be ignored, or may be included in multi-modal feature data 148/248/348 due to their association with an activity occurring in media content 146/246.

It is further noted that although MLP mixer 270/370 is depicted as such in FIGS. 2 and 3, that representation is merely provided as an example. More generally, MLP mixer 270/370 may be implemented as any NN mixer having fixed weights. That is to say, in contrast with transformer based machine learning models employing attention to dynamically determine model weights, the NN mixer corresponding to MLP mixer 270/370 and utilized in various implementations of the present multi-modal content based feature recognition solution utilizes predetermined weights that are set during training and remain fixed at runtime.

According to the exemplary implementation shown by FIGS. 2 and 3, processing of input data structure 218/318 includes passing data structure 218/318 through "N" mixing layers 372 and global average pooling layer 374 to provide multi-modal feature data 148/248/348. Processing of input data structure 218/318 to provide multi-modal feature data 148/248/348 in action 485 may be performed by multi-modal mixer software code 110/210, executed by processing hardware 104 of computing platform 102, and using MLP mixer 270/370.

Flowchart 480 further includes predicting, using ML model-based feature classifier 160/260/360 and multi-modal feature data 148/248/348, feature classification 152/252/352 of the feature (action 486). As noted above, a feature of media content 146/246 may be any of several types of features, such as an object, location, performer, character, or activity depicted or represented in one or more media modes of media content 146/246. A feature classification, as used in the present application, refers to the specific subtype of the feature as depicted in media content 146/246. For instance, in use cases in which the feature is a location depicted in media content 146/246, feature classification 152/252/352 may be a specific place name, such "John Doe's house," or "Dodger Stadium," or a specific description such as "park bench," or "city sidewalk." to name a few examples. And analogously, in use cases in which the feature is an activity depicted in media content 146/246, action 486 includes using ML model-based feature classifier 160/260/360 to perform activity recognition using multi-modal feature data 148/248/348. In those use cases, the activity may be running, walking, sitting, laughing, eating, or crying, again to name merely a few examples. Action 486 may be performed by multi-modal mixer software code 110/210, executed by processing hardware 104 of computing platform 102.

It is noted that the level of granularity, i.e., the specificity with which feature classification 152/252/352 is predicted, may be tuned during training of ML model-based feature classifier 160/260/360. For example, in some use cases, it may be advantageous or desirable to distinguish locomotion activities from emotive activities, but not to differentiate among different forms of locomotion. In those use cases, for example, each of the activities walking, running, and swimming may receive feature classification 152/252/352 "movement." However, in other implementations, feature classification ML model-based feature classifier 160/260/360 may be tuned during training to distinguish between different types of movement, in which case a different feature classification 152/252/352 may be applied to each of walking, running, and swimming to differentiate each type of movement from the others.

In some implementations, flowchart 480 may conclude with action 486 described above. However, in other implementations, flowchart 480 may further include identifying, based on feature classification 152/252/352 predicted in action 486 and multi-modal feature data 148/248/348, a timestamp of media content 146/246 corresponding to the feature, i.e., feature timestamp 154 (action 487A). That is to say, action 487A includes identifying the location, relative to the timecode of media content 146/246, at which or during which the feature corresponding to multi-modal feature data 148/248/348 and classified in action 486 occurs. Identification, in action 487A, of feature timestamp 154 corresponding to the feature classified in action 486 may be performed by feature locator software code 120, executed by processing hardware 104 of computing platform 102, as described below by reference to FIGS. 4B and 5.

Figure 4B:
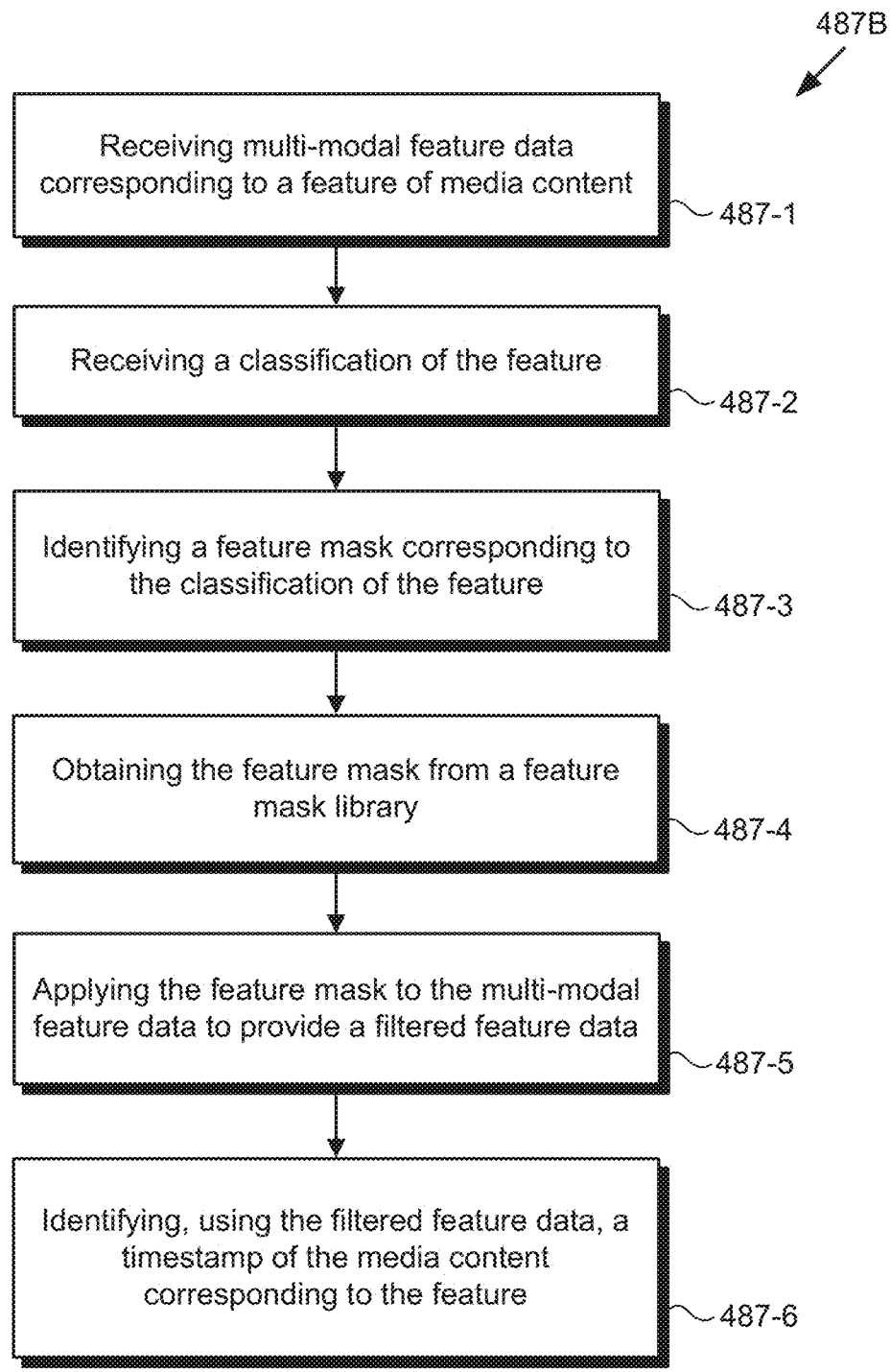
FIG. 4B shows a flowchart outlining another exemplary method for use when performing multi-modal content based automated feature recognition, according to one implementation.
Figure 5:
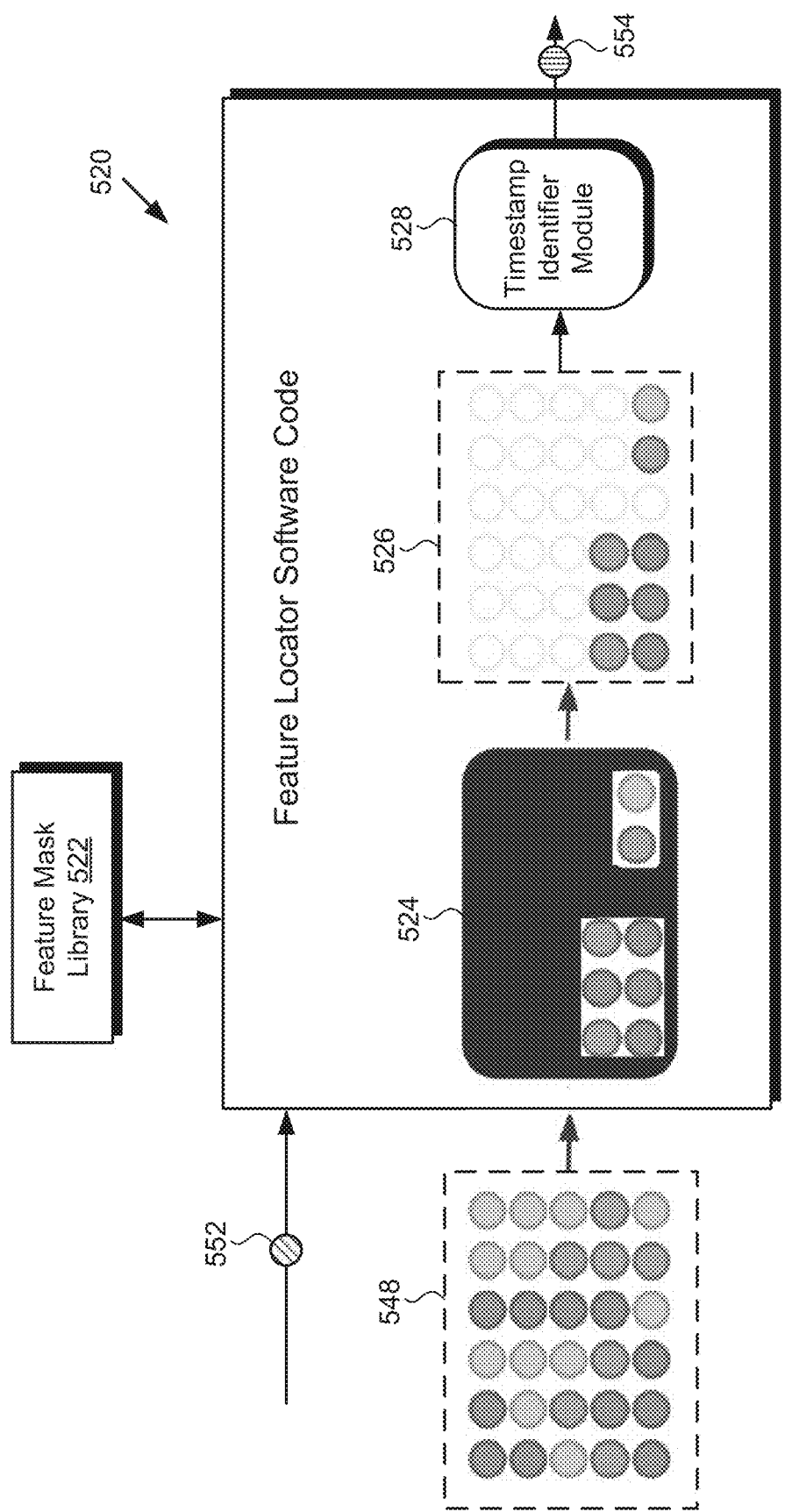
FIG. 5 shows a diagram of an exemplary feature locator software code suitable for use by the system shown in FIG. 1, according to one implementation.

FIG. 4B shows flowchart 487B presenting an exemplary method for use by system 100 to perform action 487A, in FIG. 4A, according to one implementation, while FIG. 5 shows a diagram of exemplary feature locator software code 520 suitable for use by system 100, in FIG. 1, according to one implementation. With respect to the method outlined in FIG. 4B, it is noted that certain details have been left out of flowchart 487B in order not to obscure the discussion of the inventive features in the present application.

According to the exemplary implementation shown in FIG. 5, feature locator software code 520 may include timestamp identifier module 528. Also shown in FIG. 5 are multi-modal feature data 548, feature classification 552, feature mask library 522, feature mask 524, filtered feature data 526, and feature timestamp 554.

It is noted that feature masks may take the form of respective matrices consisting of values zero or one (0 or 1), having the same dimensionality as multi-modal feature data 548 and, when multiplied with multi-modal feature data 548, will zero everything except the information related to a specific feature. Feature masks can be generated using an optimization process that starts from a random matrix, that is then updated using gradient descent to activate feature type. This process can generate multiple masks that activate the same type of feature. As a result, feature mask library 522 of feature masks may be used to find the one feature mask that best matches a specific multi-modal feature data 548.

Feature locator software code 520, feature mask library 522, feature mask 524, and feature timestamp 554 correspond respectively in general to feature locator software code 120, feature mask library 122, feature mask 124, and feature timestamp 154, in FIG. 1. Consequently, feature locator software code 120, feature mask library 122, feature mask 124, and feature timestamp 154 may share any of the characteristics attributed to respective feature locator software code 520, feature mask library 522, feature mask 524, and feature timestamp 554 by the present disclosure, and vice versa. In addition, multi-modal feature data 548 and feature classification 552 correspond respectively in general to multi-modal feature data 148/248/348 and feature classification 152/252/352 in FIGS. 1, 2, and 3. Thus, multi-modal feature data 548 and feature classification 552 may share any of the characteristics attributed to respective multi-modal feature data 148/248/348 and feature classification 152/252/352 by the present disclosure, and vice versa.

Referring now to FIG. 4B in combination with FIGS. 1, 4A, and 5, flowchart 470B may begin with receiving multi-modal feature data 148/548 provided in action 485 of flowchart 480 (action 487-1). As shown in FIG. 1, multi-modal feature data 148/548 may be provided as an input to feature locator software code 120/520 by multi-modal mixer software code 110. Thus, multi-modal feature data 148/548 may be received in action 487-1 by feature locator software code 120/520, executed by processing hardware 104 of computing platform 102.

Flowchart 470B further includes receiving feature classification 152/552 (action 487-2). As shown in FIG. 1, multi-modal feature classification 152/552 may also be provided as an input to feature locator software code 120/520 by multi-modal mixer software code 110. Thus, feature classification 152/552 may be received in action 487-2 by feature locator software code 120/520, executed by processing hardware 104 of computing platform 102.

Flowchart 470B further includes identifying a feature mask 124/524 corresponding to feature classification 152/552 (action 487-3). By way of example, because MLP mixer 270/370 in FIGS. 2 and 3 includes a concatenation of perceptrons, its functionality can be approximated as a linear operation. This implies that for a given input, a matrix can be identified that, when multiplied element-wise, approximates the output of MLP mixer 270/370, i.e., multi-modal feature data 148/548, for a particular feature type. Such a matrix, represented in FIG. 5 by feature mask 524, can be thought of as a punch card with holes in specific positions determined to be indicative of a particular feature classification and therefore useful in identifying the location of that feature relative to the timecode of media content 146. Each feature classification may have a corresponding feature mask 524 that is unique to that classification. Thus, feature mask 524 may correspond uniquely to feature classification 552. Identification of feature mask 524 corresponding to feature classification 552 may be performed by feature locator software code 120/520, executed by processing hardware 104 of computing platform 102, by reference to feature mask library 122/522.

Flowchart 470B further includes obtaining feature mask 124/524 from feature mask library 122/522 (action 487-4). As shown by FIGS. 1 and 5, feature mask 124/524 may be obtained from feature mask library 122/522 in action 487-4 by feature locator software code 120/520, executed by processing hardware 104 of computing platform 102.

Flowchart 470B further includes applying feature mask 124/524 to multi-modal feature data 148/548 to provide filtered feature data 526 (action 487-5). As shown by FIG. 5, feature mask 524 blocks all information included in multi-modal feature data 548 except for filtered feature data 526 that has been determined to be useful in identifying the location of the feature classified in action 486 of flowchart 480 relative to the timecode of media content 146. Feature mask 124/524 may be applied to multi-modal feature data 148/548 to provide filtered feature data 526 in action 487-5 by feature locator software code 120/520, executed by processing hardware 104 of computing platform 102.

Flowchart 470B further includes identifying, using filtered feature data 526, feature timestamp 554 corresponding to the feature classified in action 486 of flowchart 480 (action 487-6). That is to say, feature timestamp 554 is the timestamp of media content 146 corresponding to the location of the feature classified in action 486 of flowchart 480.

Action 487-6 may include identifying a timestamp of media content 146 corresponding to a peak intensity of filtered feature data 526 across the timecode of media content 146, for example. Identification of feature timestamp 554 in action 487-6 may be performed by feature locator software code 120/520, executed by processing hardware 104 of computing platform 102, and using timestamp identifier module 528.

As shown in FIG. 1, system 100 may provide feature classification 152, or feature classification 152 and feature timestamp 154 as outputs to one or both of annotation database 138 and user system 140. Annotation database 138 may associate feature classification 152, or feature classification 152 and feature timestamp 154 with media content 146, and may serve as persistent storage for feature classification 152, feature classification 152 and feature timestamp 154. When output to user system 140, system user 144 may utilize user system 140 to review, store, or review and store feature classification 152, or feature classification 152 and feature timestamp 154, locally.

With respect to the methods outlined by flowcharts 480 and 487B, it is noted that actions 481, 482, 483, 484, 485, and 486 (hereinafter "actions 481-486"), or actions 481-486 and action 487A, or actions 481-486 and actions 487-1, 487-2, 487-3, 487-4, 487-5, and 487-6, may be performed in an automated process from which human participation may be omitted.

Thus, the present application discloses systems and methods for performing multi-modal content based automated feature recognition that overcome the drawbacks and deficiencies in the conventional art. For example, the present multi-modal based automated feature recognition solution advances the state-of-the-art by enabling the recognition of nuanced features of media content that may be ambiguous or otherwise unidentifiable when relying on a single media mode, as is the typical approach used in the conventional art. As a result, the present multi-modal based automated feature recognition solution is advantageously more accurate than conventional single mode feature detection techniques over a more diverse range of feature types and subtypes.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform including a processing hardware and a system memory storing a software code and a machine learning (ML) model-based feature classifier;
    the processing hardware configured to execute the software code to:
        receive media content including a video component corresponding to a video mode and one of a text component or an audio component corresponding to one of a text mode or an audio mode;
        encode a plurality of video frames of the video component, using a first encoder of the software code, to generate a plurality of video embedding vectors;
        encode the one of the text component or the audio component, using a second encoder of the software code, to generate a plurality of audio embedding vectors or a plurality of text embedding vectors;
        combine the plurality of video embedding vectors and one of the plurality of audio embedding vectors or the plurality of text embedding vectors to provide an input data structure for a neural network mixer of the software code;
        process, using the neural network mixer, the input data structure to provide a feature data corresponding to a feature of the media content, wherein the neural network mixer is tuned to provide the feature data such that the feature data preferentially focuses on one of objects, locations, performers, characters, or activities depicted in the video component over others of the objects, locations, performers, characters, or activities depicted in the video component; and
        predict, using the ML model-based feature classifier and the feature data, a classification of the feature.

2. The system of claim 1, wherein the neural network mixer comprises a Multi-Layer Perceptron.

3. The system of claim 1, wherein the feature of the media content comprises an activity depicted by the media content.

4. The system of claim 1, wherein the one of the text or the audio component is the audio component corresponding to the audio mode, and wherein the plurality of video embedding vectors are combined with the plurality of audio embedding vectors to provide the input data structure for the neural network mixer of the software code.

5. The system of claim 4, wherein the media content further includes the text component corresponding to the text mode, and wherein the processing hardware is further configured to execute the software code to:
    encode the text component, using a third encoder of the software code, to generate the plurality of text embedding vectors; and
    wherein combining the plurality of video embedding vectors and the plurality of audio embedding vectors further comprises combining the plurality of video embedding vectors with the plurality of audio embedding vectors and the plurality of text embedding vectors to provide the input data structure for the neural network mixer of the software code.

6. The system of claim 4, wherein the audio component comprises an audio sample or an audio spectrogram.

7. The system of claim 1, wherein at least one of the first encoder or the second encoder comprises a transformer machine learning model.

8. The system of claim 1, further comprising a feature locator software code stored in the system memory, and wherein the processing hardware is configured to execute the feature locator software code to:
    identify, based on the classification and the feature data, a timestamp of the media content corresponding to the feature.

9. The system of claim 1, wherein the one of the text component or the audio component is the text component corresponding to the text mode.

10. The system of claim 9, wherein the text component comprises a script, a subtitle, a caption, a synopsis, a production note, or metadata formatted as text describing one or more images or audio included in the media content.

11. A method for use by a system including a computing platform having a processing hardware, and a system memory storing a software code and a machine learning (ML) model-based feature classifier, the method comprising:
- receiving, by the software code executed by the processing hardware, media content including a video component corresponding to a video mode and one of a text component or an audio component corresponding to one of a text mode or an audio mode;
- encoding, by the software code executed by the processing hardware and using a first encoder of the software code, a plurality of video frames of the video component, to generate a plurality of video embedding vectors;
- encoding, by the software code executed by the processing hardware and using a second encoder of the software code, the one of the text component or the audio component, to generate a plurality of audio embedding vectors or a plurality of text embedding vectors;
- combining, by the software code executed by the processing hardware, the plurality of video embedding vectors and one of the plurality of audio embedding vectors or the plurality of text embedding vectors to provide an input data structure for a neural network mixer of the software code;
- processing, by the software code executed by the processing hardware and using the neural network mixer, the input data structure to provide a feature data corresponding to a feature of the media content, wherein the neural network mixer is tuned to provide the feature data such that the feature data preferentially focuses on one of objects, locations, performers, characters, or activities depicted in the video component over others of the objects, locations, performers, characters, or activities depicted in the video component; and
- predicting, by the software code executed by the processing hardware and using the ML model-based feature classifier and the feature data, a classification the feature.

12. The method of claim 11, wherein the neural network mixer comprises a Multi-Layer Perceptron.

13. The method of claim 11, wherein the feature of the media content comprises an activity depicted by the media content.

14. The method of claim 11, wherein the one of the text or the audio component is the audio component corresponding to the audio mode, and wherein the plurality of video embedding vectors are combined with the plurality of audio embedding vectors to provide the input data structure for the neural network mixer of the software code.

15. The method of claim 14, wherein the media content further includes the text component corresponding to the text mode, the method further comprising:
- encoding, by the software code executed by the processing hardware and using a third encoder of the software code, the text component to generate the plurality of text embedding vectors; and wherein combining the plurality of video embedding vectors and the plurality of audio embedding vectors further comprises combining the plurality of video embedding vectors with the plurality of audio embedding vectors and the plurality of text embedding vectors to provide the input data structure for the neural network mixer of the software code.

16. The method of claim 14, wherein the audio component comprises an audio sample or an audio spectrogram.

17. The method of claim 11, wherein at least one of the first encoder or the second encoder comprises a transformer machine learning model.

18. The method of claim 11, wherein the system further comprises a feature locator software code stored in the system memory, the method further comprising:
- identifying, by the feature locator software code executed by the processing hardware based on the classification and the feature data, a timestamp of the media content corresponding to the feature.

19. A method for use by a system including a computing platform having a processing hardware, and a system memory storing a feature locator software code, the method comprising:
- receiving, by the feature locator software code executed by the processing hardware, a feature data corresponding to a feature of media content, wherein the feature data is provided by a neural network mixer based on an input data structure including a plurality of video embedding vectors in combination with one of a plurality of audio embedding vectors or a plurality of text embedding vectors, wherein the neural network mixer is tuned to provide the feature data such that the feature data preferentially focuses on one of objects, locations, performers, characters, or activities depicted in a video component of the media content over others of the objects, locations, performers, characters, or activities depicted in the video component;
- receiving, by the feature locator software code executed by the processing hardware, a classification of the feature; and
- identifying, by the feature locator software code executed by the processing hardware, based on the classification and the feature data and using a feature mask comprising a matrix having a same dimensionality as the feature data, a timestamp of the media content corresponding to the feature.

20. The method of claim 19, further comprising:
- identifying, by the feature locator software code executed by the processing hardware, the feature mask;
- obtaining, by the feature locator software code executed by the processing hardware, the feature mask from a feature mask library stored in the system memory; and
- applying, by the feature locator software code executed by the processing hardware, the feature mask to the feature data to provide a filtered feature data;
- wherein identifying the timestamp of the media content corresponding to the feature further uses the filtered feature data.

* * * * *